(12) United States Patent
    Andersson et al.

(10) Patent No.: US 11,852,045 B2
(45) Date of Patent: Dec. 26, 2023

(54) METHOD FOR CONTROLLING AN INTERNAL COMBUSTION ENGINE ARRANGEMENT

(71) Applicant: VOLVO TRUCK CORPORATION, Gothenburg (SE)

(72) Inventors: Arne Andersson, Mölnlycke (SE); David Carlson, Mölndal (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 6 days.

(21) Appl. No.: 16/767,983

(22) PCT Filed: Nov. 29, 2017

(86) PCT No.: PCT/EP2017/080765
    § 371 (c)(1),
    (2) Date: May 28, 2020

(87) PCT Pub. No.: WO2019/105538
    PCT Pub. Date: Jun. 6, 2019

(65) Prior Publication Data
    US 2020/0362733 A1    Nov. 19, 2020

(51) Int. Cl.
    *F02D 13/02*    (2006.01)
    *F01L 1/344*    (2006.01)
    (Continued)

(52) U.S. Cl.
    CPC ............. *F01L 1/3442* (2013.01); *F01L 1/047* (2013.01); *F01L 1/344* (2013.01);
    (Continued)

(58) Field of Classification Search
    CPC ......... F01L 1/344; F01L 1/047; F01L 1/3442; F01L 2820/042; F01L 2800/00;
    (Continued)

(56) References Cited

U.S. PATENT DOCUMENTS 5,419,301 A * 5/1995 Schechter ........... F02D 13/0261
                                                    123/673
6,276,321 B1    8/2001 Lichti et al.
(Continued)

FOREIGN PATENT DOCUMENTS

CN    101115913 A    1/2008
CN    101688471 A    3/2010
(Continued)

OTHER PUBLICATIONS

International Search Report and Written Opinion dated Aug. 20, 2018 in corresponding International PCT Application No. PCT/EP2017/080765, 12 pages.
(Continued)

*Primary Examiner* — Wesley G Harris
(74) *Attorney, Agent, or Firm* — Venable LLP; Jeffri A. Kaminski

(57) ABSTRACT

The present invention relates to a method for controlling an internal combustion engine arrangement (100). The internal combustion engine arrangement (100) comprises a combustion cylinder (102) and an inlet valve (106) arranged to be positioned in a closed position at a distance before a piston (104) reaches a bottom dead center during normal operation. The inlet valve is further controllable to be arranged in the open position until the piston reaches the bottom dead center if a required volumetric efficiency of the combustion cylinder is higher than a volumetric efficiency during normal operation.

13 Claims, 6 Drawing Sheets

(51) Int. Cl.
  *F01L 1/047* (2006.01)
  *F02D 41/00* (2006.01)
  *F02D 41/06* (2006.01)

(52) U.S. Cl.
  CPC ..... *F02D 13/0234* (2013.01); *F02D 13/0269* (2013.01); *F02D 41/009* (2013.01); *F02D 41/062* (2013.01); *F01L 2800/00* (2013.01); *F01L 2820/042* (2013.01); *F02D 2200/0411* (2013.01)

(58) Field of Classification Search
  CPC ............ F02D 13/0234; F02D 13/0269; F02D 13/0238; F02D 41/009; F02D 41/062; F02D 2200/0411; F02D 41/10; Y02T 10/12
  See application file for complete search history.

(56) References Cited

U.S. PATENT DOCUMENTS

| | | | |
|---|---|---|---|
| 9,222,429 B2 | 12/2015 | Luft et al. | |
| 2003/0131805 A1* | 7/2003 | Yang | F02B 69/06 123/27 R |
| 2004/0173166 A1 | 9/2004 | Kobayashi et al. | |
| 2007/0068156 A1 | 3/2007 | Rottenkolber et al. | |
| 2009/0228187 A1 | 9/2009 | Nakamura | |
| 2010/0139591 A1 | 6/2010 | Nakamura | |
| 2012/0125276 A1 | 5/2012 | Baldwin et al. | |
| 2012/0234274 A1* | 9/2012 | Hisaminato | F02D 13/0269 123/90.15 |
| 2015/0134230 A1 | 5/2015 | Hoffmeyer et al. | |
| 2016/0377002 A1 | 12/2016 | Hoffmeyer et al. | |
| 2017/0044999 A1 | 2/2017 | Wang et al. | |

FOREIGN PATENT DOCUMENTS

| | | |
|---|---|---|
| EP | 1234958 A2 | 8/2002 |
| EP | 1344897 A2 | 9/2003 |
| EP | 1363002 A1 | 11/2003 |
| EP | 1431548 A2 | 6/2004 |
| EP | 2136054 A1 | 12/2009 |
| EP | 2136054 B1 | 9/2011 |
| EP | 1428989 A1 | 1/2017 |
| JP | 2009243372 A | 10/2009 |
| WO | 2019105538 A1 | 6/2019 |

OTHER PUBLICATIONS

International Preliminary Report on Patentability dated Apr. 2, 2020 in corresponding International PCT Application No. PCT/EP2017/080765, 15 pages.
China Office Action dated Dec. 3, 2021 in corresponding China Patent Application No. 201780097156.8, 23 pages.
European Notice of Opposition dated Jun. 21, 2023 in corresponding European Patent Application No. 17804910.2, 50 pages.

\* cited by examiner

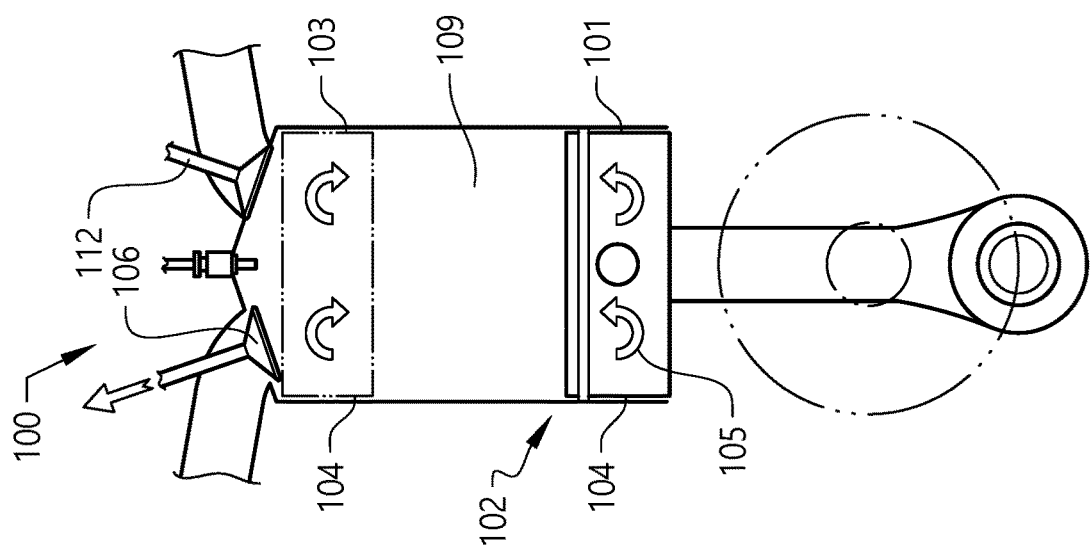
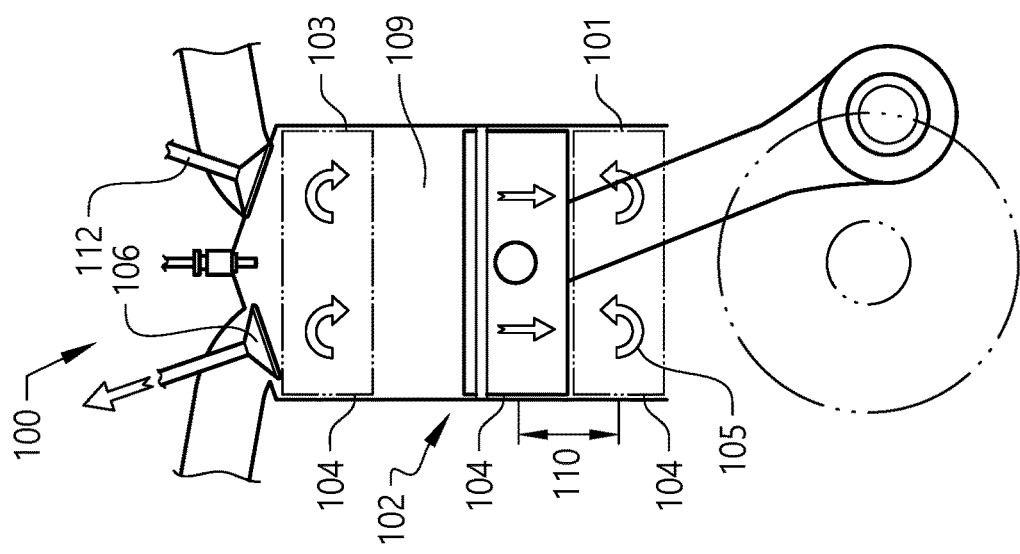
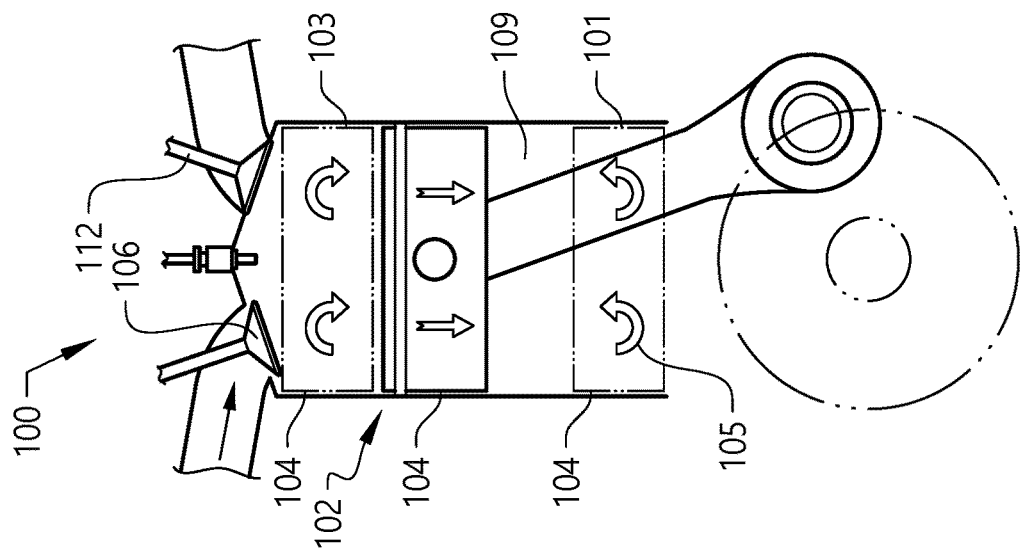
FIG. 2a
FIG. 2b
FIG. 2c

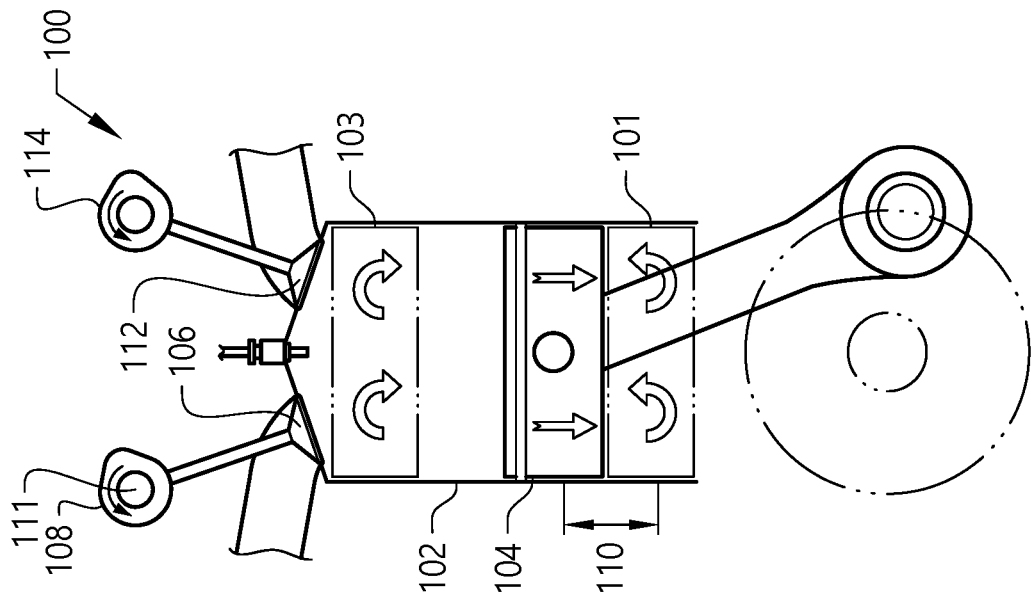
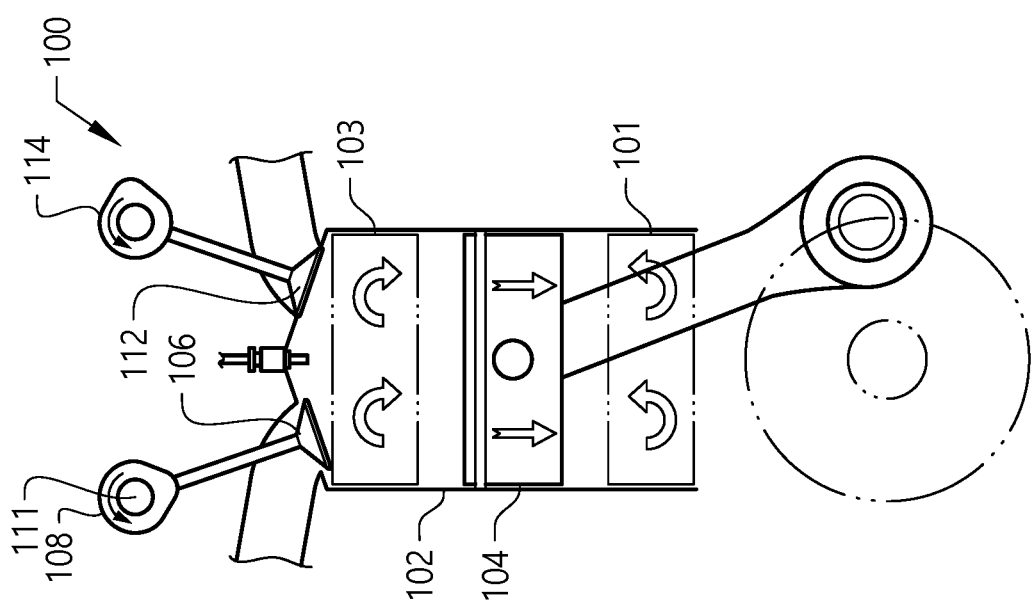

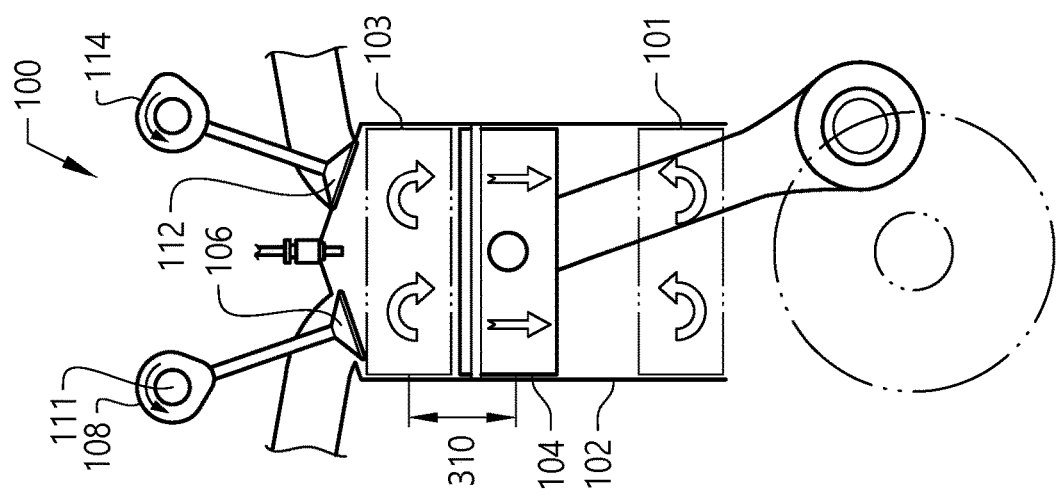
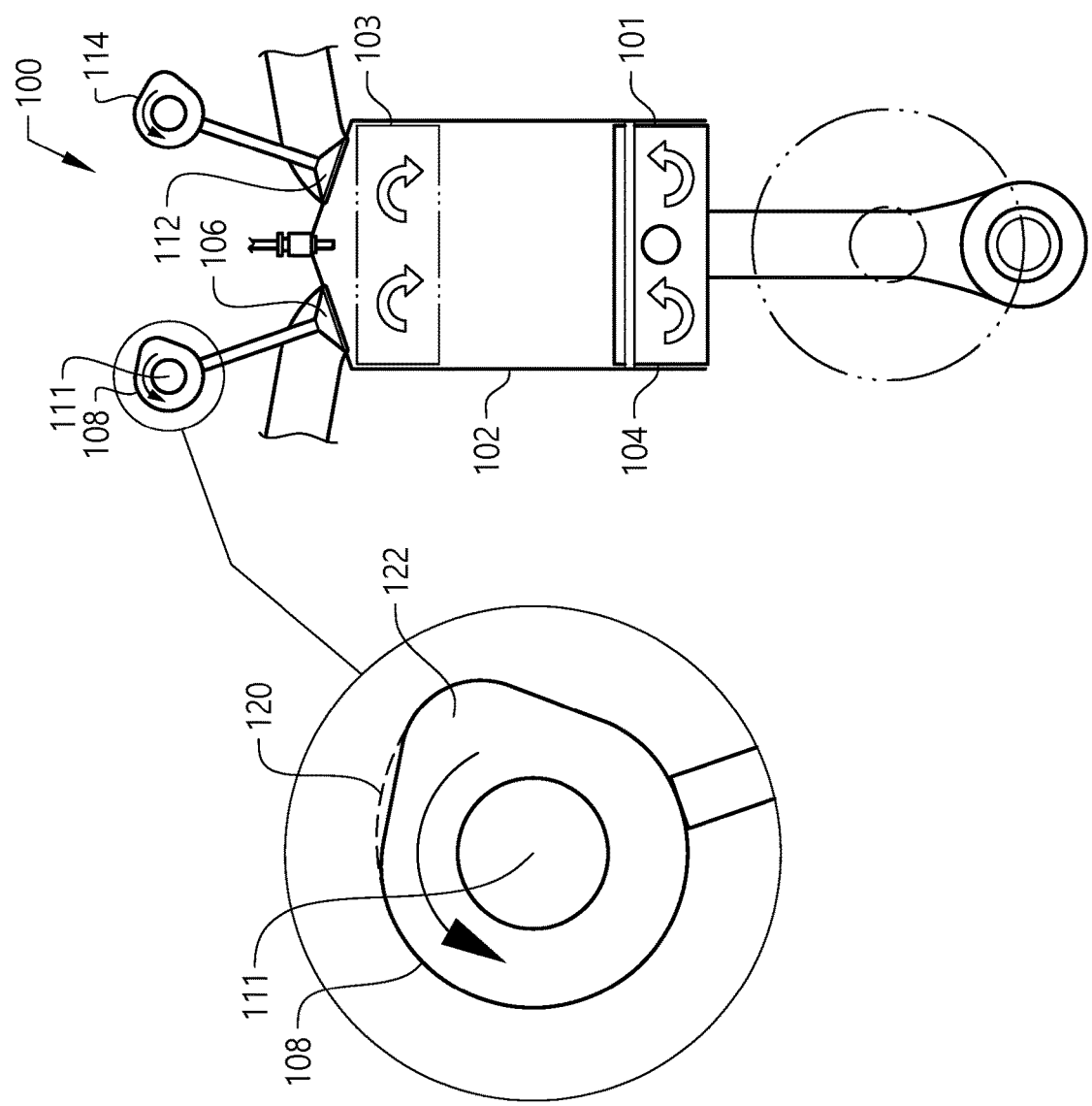
FIG. 3d
FIG. 3c

METHOD FOR CONTROLLING AN INTERNAL COMBUSTION ENGINE ARRANGEMENT

CROSS-REFERENCE TO RELATED APPLICATIONS

This application is a U.S. National Stage application of PCT/EP2017/080765, filed Nov. 29, 2017 and published on Jun. 6, 2019 as WO 2019/105538 A1, all of which is hereby incorporated by reference in its entirety.

TECHNICAL FIELD

The present invention relates to a method for controlling an internal combustion engine arrangement. The invention also relates to a corresponding internal combustion engine arrangement. The invention is applicable on vehicles, in particularly low, medium and heavy duty vehicles commonly referred to as trucks. Although the invention will mainly be described in relation to a truck, it may also be applicable for other type of vehicles.

BACKGROUND

For many years, the demands on internal combustion engines have been steadily increasing and engines are continuously developed to meet the various demands from the market. Reduction of exhaust gases, increasing engine efficiency, i.e. reduced fuel consumption, and lower noise level from the engines are some of the criteria that becomes an important aspect when choosing vehicle engine. Furthermore, in the field of trucks, there are applicable law directives that have e.g. determined the maximum amount of exhaust gas pollution allowable. Still further, a reduction of the overall cost of the vehicle is important and since the engine constitutes a relatively large portion of the total costs, it is natural that also the costs of engine components are reduced.

Conventionally, a combustion cylinder of an internal combustion engine comprises an inlet valve and an outlet valve, wherein the inlet valve is arranged in an open position at an intake phase during the downward motion of a piston in the combustion cylinder. The inlet valve is thereafter closed when the piston reaches the bottom dead center of the cylinder, and is closed during the combustion phase and the exhaust phase, and opened again when the piston reaches the top dead center for the next coming intake stroke.

There are however alternative ways of controlling the inlet valve in an internal combustion engine. One approach is the so-called Miller valve timing. The Miller valve timing approach controls the inlet valve to be closed a distance from the bottom dead center. The inlet valve can be arranged in the closed position a distance before the piston reaches the bottom dead center, so-called early Miller, or to be closed a distance after the piston has left the bottom dead center, so-called late Miller.

An advantage of controlling the internal combustion engine according to the early Miller approach is that the engine efficiency can be increased. However, controlling the internal combustion engine according to the early Miller approach may in some situations have a negative affect to the response from the engine. There is thus a desire to provide an internal combustion engine with the positive effects from an early Miller approach but which also overcomes the deficiencies thereof.

SUMMARY

It is an object of the present invention to provide a method for controlling an internal combustion engine arrangement which at least partially overcomes the above described deficiencies. This is achieved by a method according to claim 1.

According to a first aspect of the present invention, there is provided a method for controlling an internal combustion engine arrangement, the internal combustion engine arrangement comprising a combustion cylinder housing a reciprocating piston movable between a bottom dead center and a top dead center within the combustion cylinder; and an inlet valve operable between an open position and a closed position for controlling the flow of air into the combustion cylinder, the inlet valve being arranged, during normal operation of the internal combustion engine arrangement, be positioned in the open position when the piston reaches the top dead center, and to be positioned in the closed position at a distance before the piston reaches the bottom dead center, wherein the method comprises the steps of receiving a signal indicative of an operating mode of the internal combustion engine arrangement; determining a required volumetric efficiency of the combustion cylinder for operating the internal combustion engine arrangement in the operating mode; and if the required volumetric efficiency is higher than a volumetric efficiency of the combustion cylinder during normal operation of the internal combustion engine arrangement: controlling the inlet valve to be arranged in the open position until the piston reaches the bottom dead center.

The wordings "top dead center" and "bottom dead center" should be construed as respective upper and lower end positions for the reciprocating motion of the piston within the combustion cylinder. When stating that a valve is opened and closed at one of the top dead center and bottom dead center, it should be realized that some tolerances are within the scope of the specific definition. For example, when stating that the inlet valve is opened, i.e. positioned in the open position when the piston reaches the top dead center, the inlet valve must not necessarily be opened at the exact top dead center position of the piston, but can be opened slightly before the piston reached the top dead center, or slightly after the piston has left the top dead center.

Furthermore, the open position of the inlet valve is a position where ambient air is directed into the combustion chamber of the combustion cylinder. Accordingly, during normal operation, air is drawn into the combustion chamber of the combustion cylinder when the piston moves from the top dead center to a position a distance from the bottom dead center. Thus, during the final movement towards the bottom dead center, the inlet valve is closed and the air inside the combustion chamber will thus be expanded, i.e. the gas pressure within the combustion cylinder is reduced.

Furthermore, the wording "normal operation" should imply that no external force or control of the input valve is performed. Hence, during normal operation, the inlet valve is controlled to be closed a distance before the piston reaches the bottom dead center, while during the situations where an increased volumetric efficiency is required, the valve is controlled, for a short duration of time, to be closed when the piston has reached the bottom dead center. In other words, the inlet valve is in these situations arranged in the open position until the piston reaches the bottom dead center.

Still further, the "operating mode" of the internal combustion engine should be construed as a state of the internal combustion engine for operating the vehicle under a certain situation. The state of the internal combustion engine may require various volumetric efficiencies in order to operate the vehicle as desired. The wording "volumetric efficiency" should be construed as the ratio of the mass density of the air drawn into, and trapped in, the cylinder to the mass density of the same volume of air in the intake manifold of the internal combustion engine. As the inlet valve is closed before the piston reaches the bottom dead center during normal operation, the air drawn into the combustion cylinder will have less mass density in comparison to the mass density of air drawn into the cylinder when the inlet valve is open until the piston reaches the bottom dead center.

The inventors of the present disclosure have realized that by controlling the inlet valve to be arranged in the open position until the piston reaches the bottom dead center at a demand for increased volumetric efficiency, the internal combustion can achieve the benefits of being operated according to the early Miller functionality as well as achieving a quick engine response when required.

An advantage is thus that the internal combustion engine is normally operated according to the early Miller principle, which is especially advantageous in connection to the use of efficient turbo arrangements connected to the internal combustion engine. Also, early Miller has a positive impact on the emission of NOx in diesel engines, as the charge temperature and cylinder peak pressure during the combustion process is reduced in comparison to regular four stroke operations. Also, the temperature of the exhaust gases will be increased which will have a positive impact on engine after treatment systems arranged downstream the internal combustion engine. Also, phasing to a state where the inlet valve is closed at a later point in time will give the engine additional boost when this is required. Thus, the above description solves the problem often associated with early Miller, i.e. that the volumetric efficiency is too low for certain operating modes. One such situation may relate to engine braking, which can be improved by increasing the volumetric efficiency of the combustion cylinder. Other situations where increased volumetric efficiency may be requested will be given below.

According to an example embodiment, the internal combustion engine may be operated in steady state during normal operation thereof.

The wording "steady state" should be construed as a state at which the behavior of the internal combustion engine is substantially constant/unchanged during a period of time. Hence, when the internal combustion engine is operated in steady state, there is no request relating to increased engine power, etc. The wording "steady state" should of course include some tolerances, whereby e.g. the vehicle may be accelerated to some amount while still being in the steady state. According to yet another example, the internal combustion engine may be operated in steady state when the number of revolutions (rpm) of the internal combustion engine is substantially constant over a period of time. Another example is that the load of the internal combustion engine is substantially constant over a period of time.

According to an example embodiment, the inlet valve may, during normal operation of the internal combustion engine arrangement, be positioned in the closed position at a predetermined crank angle degree before the piston reaches the bottom dead center. The predetermined crank angle may be up to approximately 40-60 crank angle degrees before the piston reaches the bottom dead center, where a full four stroke cycle corresponds to 720 crank angle degrees.

According to an example embodiment, the internal combustion engine arrangement may further comprise an outlet valve operable between an open position and a closed position for controlling the flow of combustion gases out from the combustion cylinder, wherein the outlet valve is arranged in the open position after a combustion phase when the piston moves from the bottom dead center to the top dead center during normal operation of the internal combustion engine arrangement as well as when the required volumetric efficiency is higher than the volumetric efficiency of the normal operation of the internal combustion engine.

Accordingly, the outlet valve is not controlled when there is a request for increasing the volumetric efficiency. Hence, the inlet valve and the outlet valve are not connected to each other and are thus operated independently of each other. An advantage is that the operation of the inlet valve as well as the outlet valve can be controlled and optimized individually and without mutual relationship to each other. Hence, the outlet valve is controlled in the same way when operating the internal combustion engine according to the early Miller principle, as well as when there is a desire to increase the volumetric efficiency.

According to an example embodiment, the method may further comprise the step of determining that the required volumetric efficiency is higher in comparison to the normal operation of the internal combustion engine arrangement if the internal combustion engine arrangement demands for an increased engine power at the operating mode.

Hereby, increased engine power may be one situation where there is a desire to increase the volumetric efficiency. Thus, when there is a demand for increased engine power, such as e.g. during rapid acceleration, a fast response is achieved and the vehicle can be operated as desired.

According to an example embodiment, the method may further comprise the step of determining that the required volumetric efficiency is higher in comparison to the normal operation of the internal combustion engine arrangement if the internal combustion engine arrangement is operated in a transient state at the operating mode.

A transient state should be construed as a state at which the internal combustion engine has not reached steady state. Hence, in the transient state, the behavior of the internal combustion engine changes over a short time period ahead. Controlling the inlet valve to be maintained in the open position as described above for a short time period, the internal combustion engine can be controlled to relatively rapidly reach steady state operation. The amount of air drawn into the combustion cylinder during the transient state may be vital when determining how fast the steady state operation can be reached.

According to an example embodiment, the method may further comprise the step of determining that the required volumetric efficiency is higher in comparison to the normal operation of the internal combustion engine arrangement if the internal combustion engine arrangement is operated in an engine start-up state at the operating mode.

Hereby, improvements with regards to cold starting of the internal combustion engine are achieved. Heat will be generated more rapidly when increasing the volumetric efficiency which will be beneficial during cranking of the internal combustion engine.

According to an example embodiment, the internal combustion engine arrangement may further comprise a controllable inlet cam shaft connected to the inlet valve, the inlet cam shaft being arranged to, during normal operation of the internal combustion engine arrangement, position the inlet valve in an open position when the piston reaches the top dead center, and to position the inlet valve in the closed position at a distance before the piston reaches the bottom dead center, the inlet cam shaft being arranged to maintain the inlet valve in the open position until the piston reaches the bottom dead center when the required volumetric efficiency is higher than the volumetric efficiency of the combustion cylinder during normal operation of the internal combustion engine arrangement.

The inlet cam shaft is thus connected to the inlet valve. It should be understood that the inlet valve and the outlet valve are connected to separate cam shafts. As described above, the inlet cam shaft is controllable which means that it is variable such that the inlet valve can be controlled to be closed either a distance before the piston reaches the bottom dead center, or when the piston has reached the bottom dead center. The cam shaft connected to the outlet valve may thus be non-controllable and non-variable in the sense that the outlet valve is opened and closed at specific positions of the piston.

According to an example embodiment, the internal combustion engine arrangement may further comprise a cam phaser connected to the inlet cam shaft, the cam phaser being arranged for variably controlling valve timing of the inlet valve.

The cam phaser is thus an arrangement connected to the inlet cam shaft and which can change the valve timing of the inlet valve. The cam phaser is preferably arranged to rotate the inlet cam shaft such that inlet valve can be closed at a later point in time. As will be described below, the cam phaser may affect the inlet valve to also be opened at a later point in time. The cam phaser may be hydraulically controlled where hydraulic oil is provided to the cam phaser for controlling the valve timing of the inlet valve. Other types of cam phasers are also conceivable, such as e.g. electrically controlled cam phasers, etc.

According to an example embodiment, the step of controlling the inlet cam shaft may comprise the step of controlling the cam phaser to rotate the inlet cam shaft for maintaining the inlet valve in the open state until the piston reaches the bottom dead center.

Thus, as indicated above, the cam phaser may be arranged to control the inlet cam shaft to be rotated such that the valve timing is changed.

According to an example embodiment, the method may further comprise the step of controlling the inlet cam shaft to arrange the inlet valve in a fully open position at a predetermined crank angle degree from the top dead center of the piston.

As indicated above, when controlling the inlet valve to be maintained in the open position until it reaches the bottom dead center, the cam shaft may also be arranged to control the inlet valve to be opened after the piston is moved a distance from the top dead center. Hereby, the time period at which the inlet valve is arranged in the open position is postponed in comparison to the early Miller operation. The volumetric efficiency will be increased as it is more dependent on when the inlet valve is closed in comparison to when it is opened. Hence, closing the inlet valve at a later point in time will increase the volumetric efficiency despite the fact the inlet valve was opened at a substantially corresponding later point in time. According to an example embodiment, the inlet valve may be arranged to be opened at substantially the same number of crank angle degrees from the top dead center as the number of crank angle degrees from the bottom dead center when the inlet valve is closed for the early Miller operation. According to a non-limiting example, the inlet valve may be opened at 20-60 crank angle degrees from the top dead center.

According to an example embodiment, the method may further comprise the step of controlling the inlet cam shaft to gradually arrange the inlet valve from the closed position to the open position when the piston moves from the top dead center towards the bottom dead center when the internal combustion engine is operated in the operating mode.

Hereby, the inlet cam shaft can be geometrically phased such as to reduce suction of vacuum when the piston moves from the top dead center. In detail, the inlet valve will, by means of the geometric shape of the inlet cam shaft, be gradually opened when the piston moves from the top dead center.

According to one exemplary embodiment, the inlet valve and/or outlet valve are, respectively, individually controlled by means of e.g. pneumatic, hydraulic, electrical or electromechanical valve actuators.

According to a second aspect, there is provided an internal combustion engine arrangement comprising a combustion cylinder housing a reciprocating piston movable between a bottom dead center and a top dead center within the combustion cylinder; an inlet valve operable between an open and a closed position for controlling the flow of air into the combustion cylinder; wherein, during normal operation of the internal combustion engine arrangement, the inlet valve is arranged to be positioned in the open position when the piston is arranged at the top dead center, and arranged to be positioned in the closed position at a distance before the piston has reached the bottom dead center, wherein the internal combustion engine arrangement further comprises a control unit configured to receive a signal indicative of an operating mode of the internal combustion engine arrangement; determine a required volumetric efficiency of the combustion cylinder for operating the internal combustion engine arrangement in the operating mode; and if the required volumetric efficiency is higher than a volumetric efficiency of the combustion cylinder during normal operation of the internal combustion engine arrangement, the control unit is further configured to: control the inlet valve to be maintained in the open position until the piston reaches the bottom dead center.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

According to an example embodiment, the internal combustion engine arrangement may further comprise an inlet cam shaft connected to the inlet valve for controlling the inlet valve between the open position and the closed position; and a cam phaser connected to the inlet cam shaft, wherein the control unit is connected to the cam phaser for controlling the inlet valve to be maintained in the open position until the piston reaches the bottom dead center if the required volumetric efficiency is higher than the volumetric efficiency of the combustion cylinder during normal operation.

According to an example embodiment, the cam phaser may be arranged to control the inlet cam shaft to position the inlet valve in the closed position at a distance of at least 20 crank angle degrees before the piston has reached the bottom dead center during normal operation of the internal combustion engine. According to an example, the inlet valve may be arranged in the closed position between 20-60 crank angle degrees before the piston has reached the bottom dead center.

According to an example embodiment, the internal combustion engine arrangement may further comprise an outlet valve for controllably delivery of combustion gases generated in the combustion cylinder out from the combustion cylinder; and an outlet cam shaft connected to the outlet valve for controlling the outlet valve between an open position and a closed position.

As described above in relation to the first aspect, the first and second cam shafts are separate cam shaft.

According to an example embodiment, the cam phaser may be a fluidly controlled cam phaser comprising a phaser piston connected to the inlet cam shaft, the phaser piston being positioned in a pressure chamber of the cam phaser, wherein the cam phaser is arranged to receive pressurized fluid into the pressure chamber for controlling the position of the inlet cam shaft.

According to one exemplary embodiment, the internal combustion engine arrangement comprises pneumatic, hydraulic, electrical or electro-mechanical valve actuators, for individually controlling the inlet valve and/or outlet valve.

Further effects and features of the second aspect are largely analogous to those described above in relation to the first aspect.

According to a third aspect, there is provided a vehicle comprising an internal combustion engine arrangement according to any of the embodiments described above in relation to the second aspect.

According to a fourth aspect, there is provided a computer program comprising program code means for performing any of the steps described above in relation to the first aspect when the program is run on a computer.

According to a fifth aspect, there is provided a computer readable medium carrying a computer program comprising program means for performing any of the steps described above in relation to the first aspect when the program means is run on a computer.

Effects and features of the third, fourth and fifth aspects are largely analogous to those described above in relation to the first and second aspects.

Further features of, and advantages with, the present invention will become apparent when studying the appended claims and the following description. The skilled person will realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein:

FIGS. 2a-2c illustrate a combustion cylinder under operation according to an example embodiment;

FIGS. 3a-3d illustrate a combustion cylinder under operation according to another example embodiment;

DETAILED DESCRIPTION OF EXAMPLE EMBODIMENTS OF THE INVENTION

Figure 1:
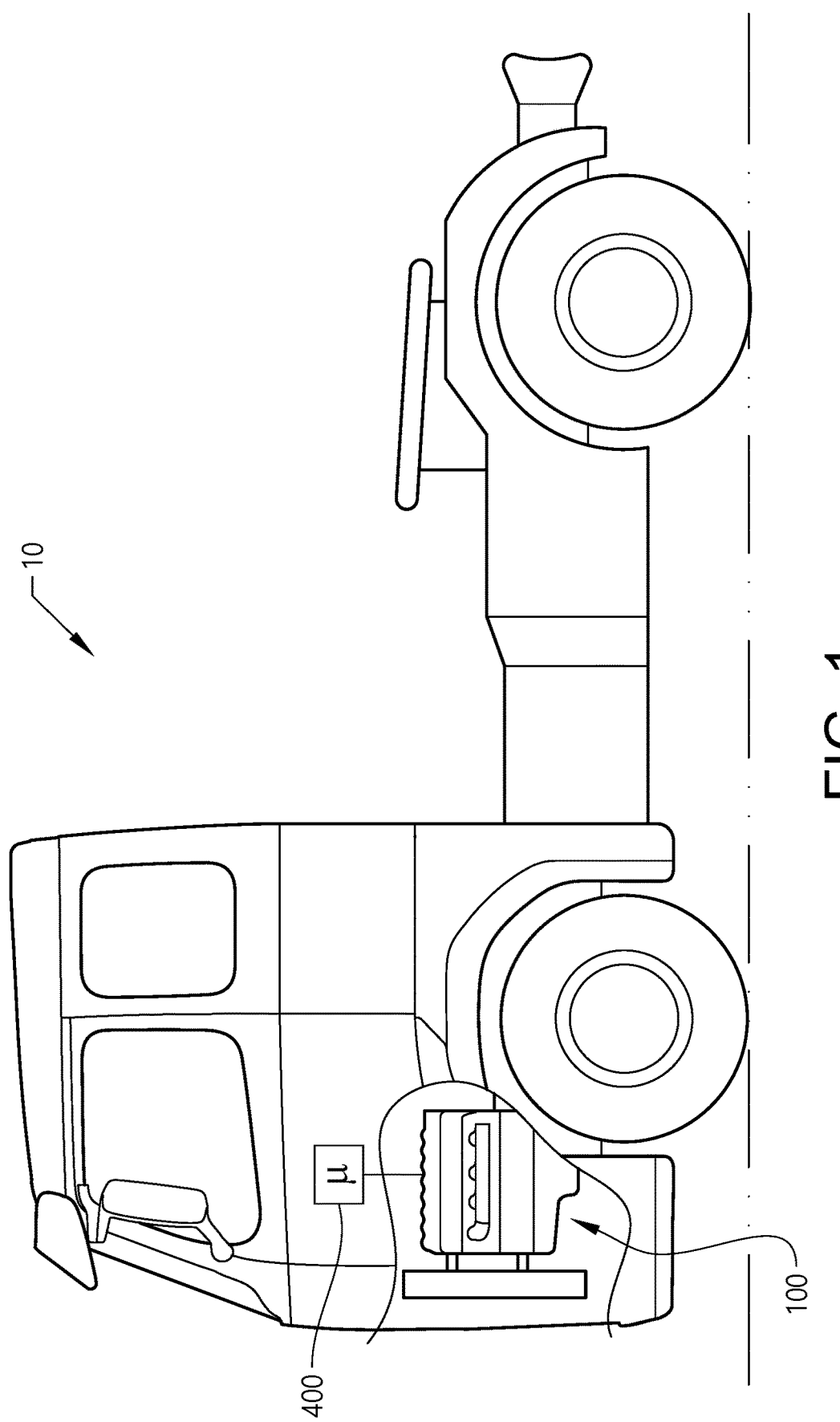
FIG. 1 is a lateral side view illustrating an example embodiment of a vehicle in the form of a truck.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is provided a vehicle 10 in the form of a truck. The vehicle 10 comprises a prime mover 100 in the form of an internal combustion engine arrangement 100. The internal combustion engine arrangement 100 may be propelled by e.g. a conventional fuel such as diesel, although other alternatives are conceivable. The internal combustion engine 100 is preferably operated in a four stroke fashion, i.e. operated by an intake stroke, a compression stroke, a combustion stroke, and an exhaust stroke. As further depicted in FIG. 1, the internal combustion engine arrangement 100 also comprises a control unit 400 for controlling operation of the internal combustion engine arrangement 100. The control unit 400 is thus preferably arranged to control inlet and outlet valves (depicted in FIGS. 2a-3c) and/or to control operation of the cam phaser (200 in FIGS. 4a-4b) described below.

In order to describe the operation of a combustion cylinder 102 of the internal combustion engine arrangement 100 in FIG. 1, reference is made to FIGS. 2a-2c. As can be seen in FIGS. 2a-2c, the combustion cylinder 102 comprises a reciprocating piston 104 movable between a bottom dead center 101 (BDC) and a top dead center 103 (TDC) within the combustion cylinder 102. The BDC 101 is the position of the turning point when the downward motion of the piston 104 is changed to the upward motion within the combustion cylinder 102, which turning point is indicated by arrow 105. The piston 104 is also indicated in dashed lines at the BDC 101. Likewise, the TDC 103 is the position of the turning point when the upward motion of the piston 104 is changed to the downward motion within the combustion cylinder 102. The piston 104 is also indicated in dashed lines at the TDC 103.

Furthermore, the internal combustion engine arrangement 100 also comprises an inlet valve 106 operable between an open position and a closed position, wherein gas, preferably in the form of ambient air, is directed into a combustion chamber 109 of the combustion cylinder 102 when the inlet valve 106 is positioned in the open position. Thus, the inlet valve 106 is preferably arranged in the open position during the intake stroke when the piston 104 moves downwards from the TDC towards the BDC. Hereby, ambient air is delivered into combustion chamber. The internal combustion engine arrangement 100 also comprises an outlet valve 112 which is operable between an open position and a closed position. The outlet valve 112 is closed during the intake stroke, the compression stroke and the combustion stroke.

The outlet valve 112 is preferably arranged in the open position after the combustion stroke when the piston moves in the upwards direction from the BDC 101 towards the TDC 103. The inlet valve 106 as well as the outlet valve 112 may be controlled by means of e.g. a pressurized fluid which forces the respective valve to be opened and closed. Such pressurized fluid is preferably a high pressure gas, such as e.g. high pressure air. Opening and closing of such valve is preferably controlled by the above described control unit 400. Thus, the control unit 400 sends control signals for controlling delivery of high pressure gas to open the respective valve. According to another embodiment, which is depicted and described below with reference to FIGS. 3a-3d, the inlet valve 106 and the outlet valve 112 may be connected to a respective cam shaft for controlling operation thereof.

The following will now describe how the internal combustion engine arrangement 100 is controlled during normal operation thereof. Reference is therefore made to FIGS. 2a-2b. The normal operation may relate to a steady state operation of the internal combustion engine arrangement 100, where the internal combustion engine arrangement 100 is operated relatively constant during a period of time. The steady state operation may thus relate to the energy provided into the system and the energy delivered out from the system after combustion, which should be substantially the same during steady state operation.

As depicted in FIG. 2a, the piston 104 is moved downwards from the TDC 103 towards the BDC 101, and the inlet valve 106 is arranged in the open position for directing air into the combustion chamber 109. FIG. 2a thus illustrates the intake stroke for the internal combustion engine arrangement 100. The inlet valve 106 is thus arranged in the open position during the downward motion from the TDC 103 towards the BDC 101. As depicted in FIG. 2b, a distance 110 before the piston reaches the BDC 101, the inlet valve 106 is positioned in the closed position, as indicated by the arrow indicating the closing motion of the inlet valve 106, such that no further air is directed into the combustion chamber 109 of the combustion cylinder 102 when the piston travels the distance 110 to the BDC 101. According to a non-limiting example, the distance 110 before the piston reaches the BDC may be between 20-60 crank angle degrees. Hereby, the air inside the combustion chamber 109 will be expanded when the piston moves downwards and the inlet valve 106 is closed. When the piston thereafter reaches the BDC 101, indicated by the piston 104 in dashed lines, the compression stage is initiated, where after combustion and exhaust takes place according to normal four stroke principle. Accordingly, the internal combustion engine arrangement is in FIGS. 2a-2b operated according to the so-called early Miller approach.

However, there are situations where the volumetric efficiency of the combustion cylinder achieved when operating the internal combustion engine arrangement 100 according to the early Miller approach is insufficient to achieve the desired response from the engine. Reference is therefore made to FIG. 2c in which an approach is depicted for increasing the volumetric efficiency of the combustion cylinder 102. These situations may occur during start-up of the internal combustion engine, during transient load situations, etc. The transient load situations may, for example, relate to situations where the internal combustion engine arrangement 100 is in sudden need of additional power/boost for operating the vehicle satisfactory at the specific situation.

As depicted in FIG. 2c, during a situation where there is a demand for an increased volumetric efficiency in comparison to the normal operation, the inlet valve 106 is controlled to be maintained in the open position until the piston 104 reaches the BDC 101. This may be controlled by the control unit 400 depicted in FIG. 1. Accordingly, when the required volumetric efficiency is increased, the inlet valve 106 can be controlled to be positioned in the open position during the movement of the piston 104 from the TDC 103 to the BDC 101. The closing motion of the inlet valve 106 in FIG. 2c is indicated by the arrow arranging the inlet valve in the closed position. The internal combustion engine arrangement 100 can be arranged to be controlled according to the illustration in FIG. 2c for a relatively short period of time until the internal combustion engine arrangement 100 is again operated in the steady state operation.

The inlet valve 106 as well as the outlet valve 112 may preferably be controlled by means of a respective cam shaft 108, 114. When the cam shafts 108, 114 are rotated, a cam lobe 122 of the cam shaft cyclically pushes the respective valve to be arranged in the open position. Cam shafts are well known and need no further description. An example embodiment when controlling the inlet valve 106 and the outlet valve 112 by means of a respective cam shaft will now be described with reference to FIGS. 3a-3d.

With reference to FIGS. 3a-3b, which indicate substantially the same operation as depicted in FIGS. 2a-2b. Accordingly, the internal combustion engine 100 is in FIGS. 3a-3b operated according to the early Miller principle. Hereby, the inlet cam shaft 108 which is connected to the inlet valve 106 is arranged in such a way as to close the inlet valve 106 during the intake stroke when the piston 104 is, during the downward motion, located the distance 110 from the BDC. Hence, the inlet cam shaft 108 controls the inlet valve 106 to be positioned in the open position from the TDC 103 until the piston is located at the distance 110 from the BDC. In the illustrated embodiment of FIGS. 3a-3b, the cam shaft 108 is rotated counter clockwise around a cam shaft axis 111 during normal operation.

Reference is now made to FIGS. 3c-3d, which illustrate the operation of the combustion cylinder 102 when there is a demand for increased volumetric efficiency of the combustion cylinder 102. Similar to the description given above in relation to FIG. 2c, the inlet valve 106 of the embodiment depicted in FIG. 3c is maintained in the open position until the piston 104 reaches the BDC 101. This is preferably achieved by rotating the cam shaft 108 in a clockwise direction relative the cam shaft axis 111 such that the closing of the inlet valve 106 is delayed when the cam shaft rotates in the counter clockwise direction. Rotation of the inlet cam shaft 108 relative the cam shaft axis 111 is preferably performed by means of a so-called cam phaser. An example embodiment of such cam phaser 200 is described below with reference to FIG. 4a.

As the inlet cam shaft 108 is rotated in the clockwise direction, the inlet valve 108 may not be opened at the TDC 103 as performed during the normal operation depicted in FIGS. 3a-3b. The opening of the inlet valve 106 is thus made at a corresponding distance 310 after the piston 104 has left the TDC 103, which is indicated in FIG. 3d. The opening and closing of the inlet valve 106 depicted in FIGS. 3c-3d is hereby postponed in comparison to the opening and closing of the inlet valve 106 during the early Miller operation as depicted in FIGS. 3a-3b. The distance 310 from the TDC 103 may correspond to the above described distance 110 from the BDC 101 during the early Miller operation. In order to compensate for the delayed opening of the inlet valve 106 depicted in FIG. 3d, the inlet cam shaft 108 is preferably designed for successively opening the inlet valve 106 at an earlier point in time, i.e. successively opening the inlet valve 106 before the piston 104 has travelled the full distance 310 from the TDC in FIG. 3d. This can be achieved by adding a ramp 120 (see zoom-in portion of FIG. 3c) to the left side of the cam lobe 122. Hereby, the ramp 120 will initiate opening of the inlet valve 106 at an earlier point in time. The specific side of the ramp 120 relative the cam lobe 122 is naturally dependent on the rotational direction of the cam shaft 108.

Figure 4B:
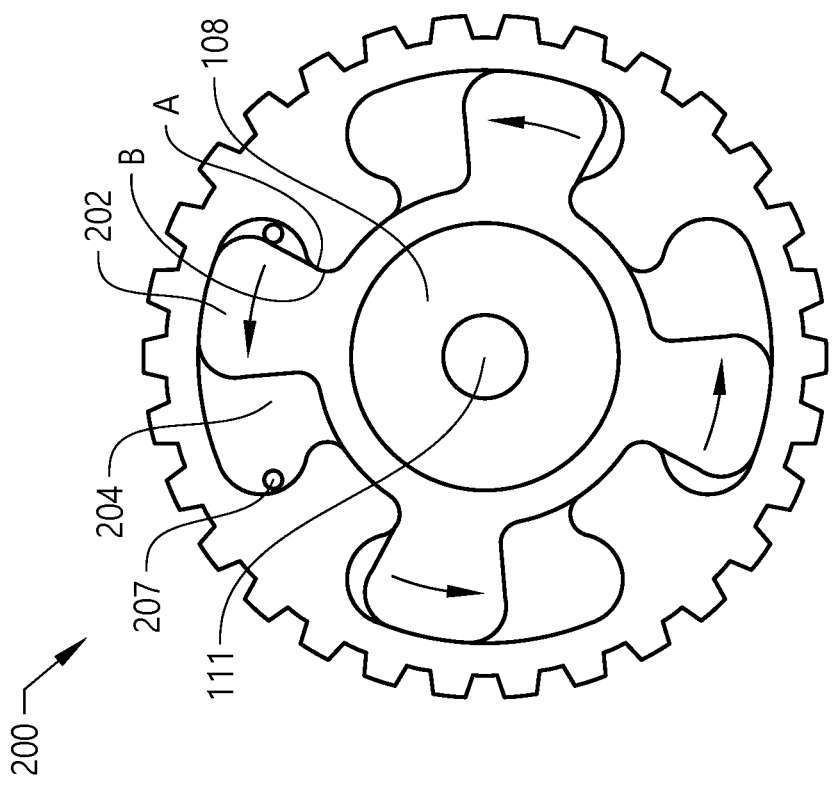
FIGS. 4a-4b illustrate a cam phaser according to an example embodiment.
Figure 4A:
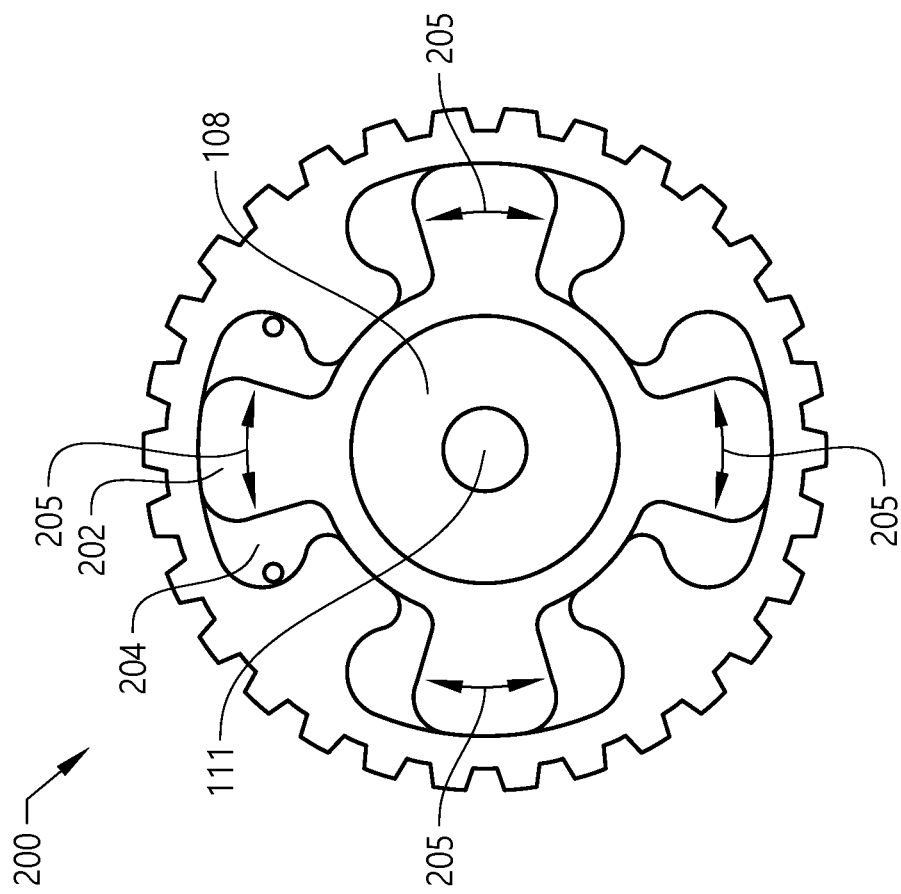

Reference is now made to FIGS. 4a-4b which illustrate a cam phaser 200 according to an example embodiment. The cam phaser 200 is thus connected to the inlet cam shaft 108 for controllably rotating the inlet cam shaft 108. The cam phaser 200 in FIGS. 4a-4b comprises a phaser piston 202 which is movable within a pressure chamber 204 of the cam phaser 200. The phaser piston 202 is in turn connected to the inlet cam shaft 108. As depicted in FIG. 4a, the cam phaser 200 is positioning the inlet cam shaft 108 in the neutral position for operating the combustion cylinder 102 as depicted in FIGS. 3a-3b. The phaser piston 202 is however movable to the left and right as depicted with the double sided arrows 205. In particular, when controlling the inlet cam shaft 108 to be rotated in the clockwise direction as described above in relation to FIG. 3c, the phaser piston 202, and thus the inlet cam shaft 108 is moved in the clockwise direction. This is preferably performed by supplying high pressure air to an inlet 207 of the pressure chamber 204.

Figure 5:
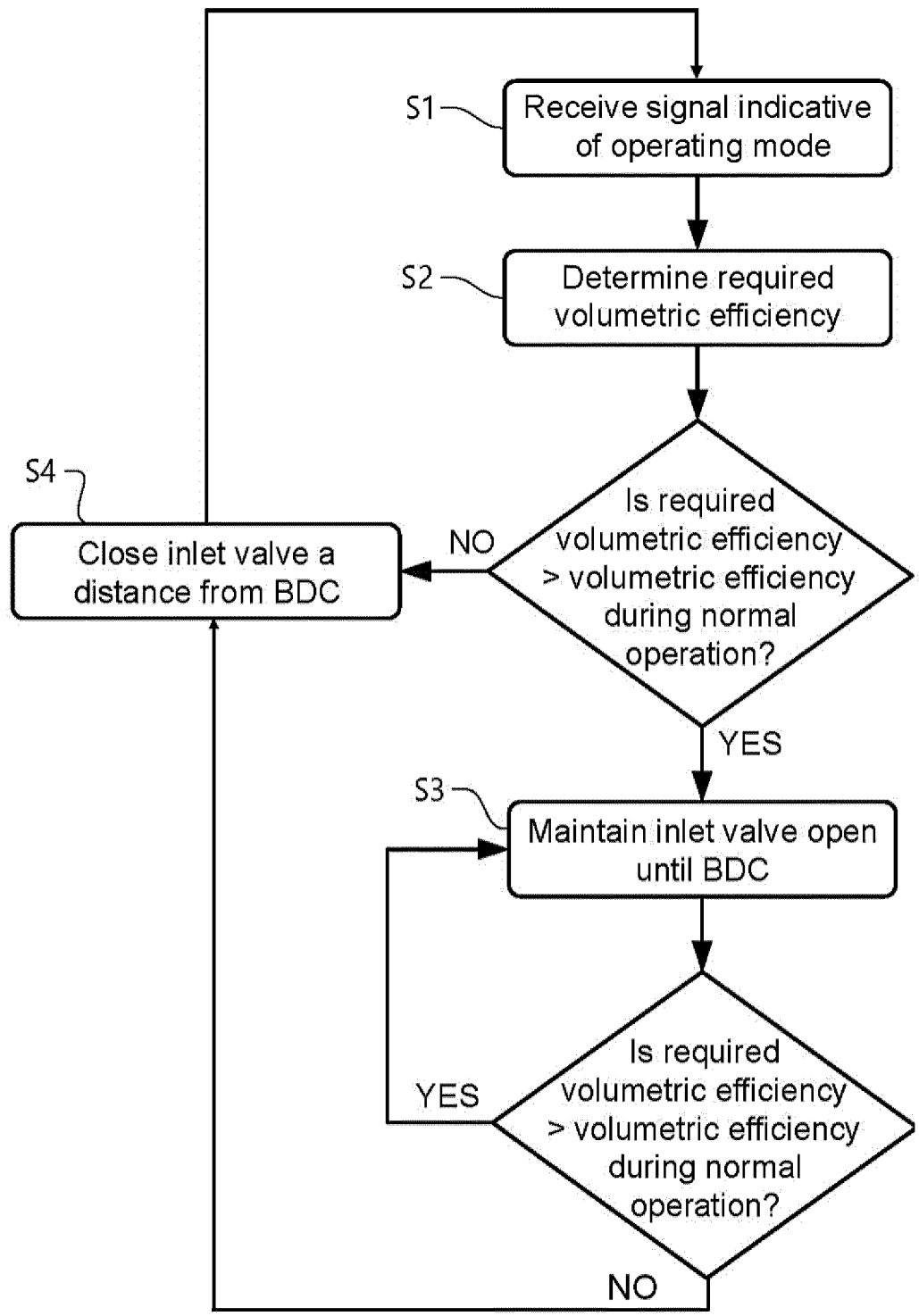
FIG. 5 is a flow chart of a method for controlling an internal combustion engine according to an example embodiment.

In order to sum up, reference is made to FIG. 5 which is a flow chart of a method for controlling the above described internal combustion engine arrangement 100 according to an example embodiment. During operation, a signal is received S1, which signal is indicative of an operating mode of the internal combustion engine arrangement 100. The signal may thus relate to how the internal combustion engine arrangement 100 is operated, such as e.g. operated in the above described steady state operation or in a transient operating mode. A required volumetric efficiency of the combustion cylinder 102 for operating the internal combustion engine arrangement 100 in the operating mode can thereafter be determined S2. It is thereafter determined if the required volumetric efficiency is higher than the volumetric efficiency of the combustion cylinder 102 during normal operation. If the required volumetric efficiency is higher, the inlet valve 106 is controlled S3 to be arranged in the open position until the piston reaches the BDC 101. On the other hand, if the required volumetric efficiency is lower, or the same, as the volumetric efficiency of the combustion cylinder 102 during normal operation, the inlet valve 106 is controlled S4 to be operated according to the early Miller approach, i.e. to be arranged in the closed position a distance 110 before the piston 104 reaches the BDC 101, whereby the method starts over.

As also depicted in FIG. 5, when, or after, the step of controlling the inlet valve 106 to be maintained in the open position until the piston reaches the BDC 101, it is determined if the required volumetric efficiency is higher than the volumetric efficiency of the combustion cylinder 102 during normal operation. If the required volumetric efficiency is higher, the internal combustion engine arrangement 100 is continued to be controlled S3 such that the inlet valve 106 is arranged in the open position until the piston reaches the BDC 101. On the other hand, if the required volumetric efficiency is lower, or the same, as the volumetric efficiency of the combustion cylinder 102 during normal operation, the internal combustion engine arrangement 100 is returned to be controlled according to the early Miller approach, whereby the method starts over.

Accordingly, the internal combustion engine arrangement is normally operated according to the step indicated by S4 in FIG. 5, i.e. according to the early Miller approach such that the inlet valve is closed a distance before the piston reaches the BDC. For certain situations when there is requested need for increased volumetric efficiency, the inlet valve is maintained in the open position until the piston reaches the BDC. It should thus be clear that when there no longer is a need for increased volumetric efficiency, the internal combustion engine is again operated according to the early Miller approach.

It is to be understood that the present invention is not limited to the embodiments described above and illustrated in the drawings; rather, the skilled person will recognize that many changes and modifications may be made within the scope of the appended claims. It should also be readily understood that the above described steps can be executed simultaneously and the above described order is merely for simplicity of understanding.

The invention claimed is:

1. A method for controlling an internal combustion engine arrangement, the internal combustion engine arrangement comprising
   a combustion cylinder housing a reciprocating piston movable between a bottom dead center and a top dead center within the combustion cylinder;
   an inlet valve operable between an open position and a closed position for controlling a flow of air into the combustion cylinder;
   a controllable inlet cam shaft connected to the inlet valve, the inlet cam shaft being arranged to, during normal operation of the internal combustion engine arrangement, position the inlet valve from the closed position to the open position when the piston reaches the top dead center, and to position the inlet valve in the closed position at a predetermined crank angle degree before the piston reaches the bottom dead center; and
   a cam phaser connected to the inlet cam shaft, the cam phaser being arranged for variably controlling valve timing of the inlet valve, the method comprising the steps of:
   receiving a signal indicative of an operating mode of the internal combustion engine arrangement;
   determining a required volumetric efficiency of the combustion cylinder for operating the internal combustion engine arrangement in the operating mode; and
   if the required volumetric efficiency is higher than a volumetric efficiency of the combustion cylinder during the normal operation of the internal combustion engine arrangement:
   controlling, using the cam phaser connected to the inlet cam shaft, the inlet valve to be arranged in the open position at a number of crank angle degrees after the piston has left the top dead center, the number of crank angle degrees after the piston has left the top dead center corresponds to the predetermined crank angle degree from the bottom dead center when the inlet valve is closed during the normal operation of the internal combustion engine arrangement, and
   maintaining the inlet valve in the open position until the piston reaches the bottom dead center.

2. The method according to claim 1, wherein the internal combustion engine arrangement is operated in steady state during the normal operation thereof.

3. The method according to claim 1, wherein the internal combustion engine arrangement further comprises an outlet valve operable between an open position and a closed position for controlling a flow of combustion gases out from the combustion cylinder, wherein the outlet valve is arranged in the open position after a combustion phase when the piston moves from the bottom dead center to the top dead center during the normal operation of the internal combustion engine arrangement as well as when the required volumetric efficiency is higher than the volumetric efficiency of the normal operation of the internal combustion engine arrangement.

4. The method according to claim 1, further comprising the step of: determining that the required volumetric efficiency is higher in comparison to the normal operation of the internal combustion engine arrangement if the internal combustion engine arrangement demands for an increased engine power at the operating mode.

5. The method according to claim 1, further comprising the step of: determining that the required volumetric efficiency is higher in comparison to the normal operation of the internal combustion engine arrangement if the internal combustion engine arrangement is operated in a transient state at the operating mode.

6. The method according to claim 1, further comprising the step of: determining that the required volumetric efficiency is higher in comparison to the normal operation of the internal combustion engine arrangement if the internal combustion engine arrangement is operated in an engine start-up state at the operating mode.

7. The method according to claim 1, wherein the step of controlling, using the cam phaser connected to the inlet cam shaft to open the inlet valve at the number of crank angle degrees after the piston has left the top dead center comprises the step of:
controlling the cam phaser to rotate the inlet cam shaft for maintaining the inlet valve in an open state until the piston reaches the bottom dead center when the required volumetric efficiency is higher than the volumetric efficiency of the combustion cylinder during the normal operation of the internal combustion engine arrangement.

8. The method according to claim 1, further comprising the step of: controlling the inlet cam shaft to arrange the inlet valve in a fully open position at a predetermined crank angle degree from the top dead center of the piston.

9. The method according to claim 1, further comprising the step of: controlling the inlet cam shaft to gradually arrange the inlet valve from the closed position to the open position when the piston moves from the top dead center towards the bottom dead center when the internal combustion engine arrangement is operated in the operating mode.

10. An internal combustion engine arrangement comprising a combustion cylinder housing a reciprocating piston movable between a bottom dead center and a top dead center within the combustion cylinder; an inlet valve operable between an open and a closed position for controlling a flow of air into the combustion cylinder; a controllable inlet cam shaft connected to the inlet valve, the inlet cam shaft being arranged to, during normal operation of the internal combustion engine arrangement, position the inlet valve from the closed position to the open position when the piston reaches the top dead center, and to position the inlet valve in the closed position at a predetermined crank angle degree before the piston reaches the bottom dead center; and a cam phaser connected to the inlet cam shaft, the cam phaser being arranged for variably controlling valve timing of the inlet valve, wherein the internal combustion engine arrangement further comprises a control unit configured to:
receive a signal indicative of an operating mode of the internal combustion engine arrangement;
determine a required volumetric efficiency of the combustion cylinder for operating the internal combustion engine arrangement in the operating mode; and
if the required volumetric efficiency is higher than a volumetric efficiency of the combustion cylinder during the normal operation of the internal combustion engine arrangement, the control unit is further configured to:
control the cam phaser connected to the inlet cam shaft to open the inlet valve at a number of crank angle degrees after the top dead center, the number of crank angle degrees after the piston has left the top dead center corresponds to the predetermined crank angle degree from the bottom dead center when the inlet valve is closed during the normal operation of the internal combustion engine arrangement, and
maintain the inlet valve in the open position until the piston reaches the bottom dead center.

11. The internal combustion engine arrangement according to claim 10, wherein the cam phaser is arranged to control the inlet cam shaft to position the inlet valve in the closed position at a distance of at least 20 crank angle degrees before the piston has reached the bottom dead center during the normal operation of the internal combustion engine arrangement.

12. The internal combustion engine arrangement according to claim 10, further comprising an outlet valve for controllably delivery of combustion gases generated in the combustion cylinder out from the combustion cylinder; and an outlet cam shaft connected to the outlet valve for controlling the outlet valve between an open position and a closed position.

13. A vehicle comprising the internal combustion engine arrangement according to claim 10.

* * * * *